United States Patent
Matsushiro

(10) Patent No.: US 7,073,764 B2
(45) Date of Patent: Jul. 11, 2006

(54) SEAT TRACK MECHANISM FOR VEHICLE SEAT

(75) Inventor: Hiromasa Matsushiro, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 211 days.

(21) Appl. No.: 10/742,642

(22) Filed: Dec. 19, 2003

(65) Prior Publication Data

US 2004/0155168 A1 Aug. 12, 2004

(30) Foreign Application Priority Data

Dec. 27, 2002 (JP) ............................. 2002-381764

(51) Int. Cl.
*F16M 13/00* (2006.01)
*B60N 2/02* (2006.01)

(52) U.S. Cl. .................. 248/424; 248/429; 296/65.13; 297/344.1

(58) Field of Classification Search ................ 248/424, 248/429, 419; 297/344.1, 250.1, 344.13, 297/477; 307/10.1; 296/65.13, 65.01, 63.02, 296/65.14
See application file for complete search history.

(56) References Cited

U.S. PATENT DOCUMENTS

| | | | | |
|---|---|---|---|---|
| 4,909,468 A * | 3/1990 | Aihara et al. | ................ | 248/429 |
| 5,104,084 A * | 4/1992 | Kumagai et al. | ............ | 248/430 |
| 5,188,329 A * | 2/1993 | Takahara | .................... | 248/430 |
| 5,482,243 A * | 1/1996 | Minder | .................... | 248/345.1 |
| 5,516,071 A * | 5/1996 | Miyauchi | .................... | 248/429 |
| 5,868,450 A * | 2/1999 | Hashimoto | ................ | 296/65.09 |
| 5,950,978 A * | 9/1999 | Eguchi et al. | ............... | 248/429 |
| 6,244,660 B1 * | 6/2001 | Yoshimatsu | .............. | 297/344.1 |
| 6,382,673 B1 * | 5/2002 | Ando | ....................... | 280/801.2 |
| 6,511,032 B1 * | 1/2003 | Lee | ............................ | 248/429 |
| 6,593,735 B1 * | 7/2003 | Becker | .................. | 324/207.26 |
| 6,655,739 B1 * | 12/2003 | Furukawa | .............. | 297/344.11 |
| 2004/0159764 A1 * | 8/2004 | Oshima et al. | ............. | 248/429 |
| 2005/0093328 A1 * | 5/2005 | Moriyama | ............... | 296/65.15 |

FOREIGN PATENT DOCUMENTS

JP 2001001800 A * 1/2001

* cited by examiner

*Primary Examiner*—Anita M. King
(74) *Attorney, Agent, or Firm*—Dann, Dorfman, Herrell and Skillman, P.C.

(57) ABSTRACT

A seat track mechanism for a vehicle seat, comprises a pair of substantially parallel movable rails attached to the vehicle seat, a pair of substantially parallel stationary rails attached to a floor section of a vehicle, the movable rails being combined with the stationary rails so as to be slidable along the stationary rails, and shutter members for covering the stationary rails, the shutter members being movably supported to the stationary rails so as to pass around one ends of the stationary rails, around the other ends of the stationary rails, and then under bottom portions of the stationary rails, the shutter members having openings, and the movable rails being combined with the stationary rails through the openings of the shutter members.

24 Claims, 5 Drawing Sheets

FIG. 4
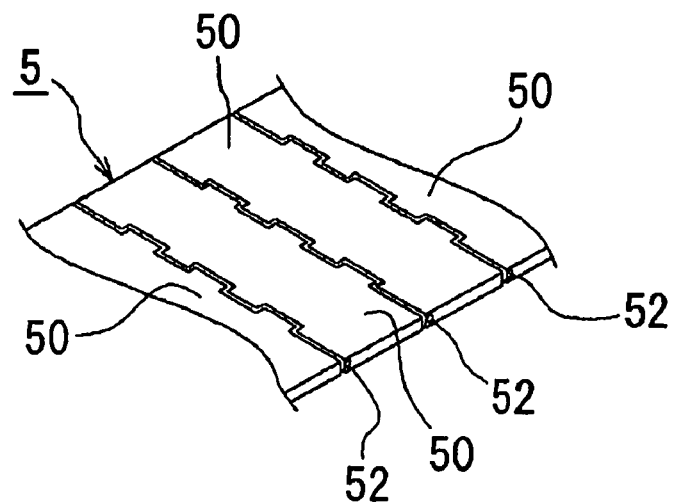
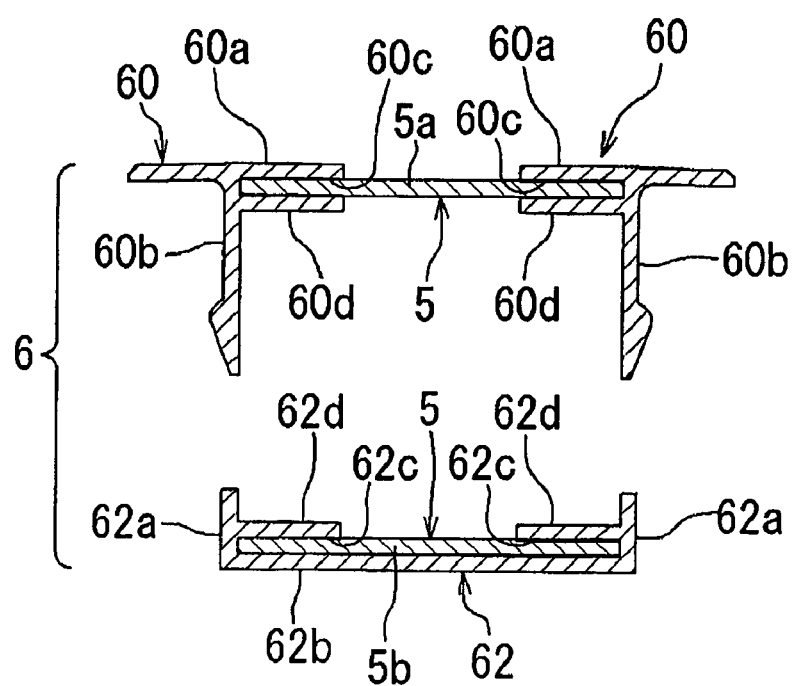
FIG. 5

SEAT TRACK MECHANISM FOR VEHICLE SEAT

BACKGROUND OF THE INVENTION

1. Field of the Invention

This invention relates to a seat track mechanism for allowing a vehicle seat to be forward and rearward moved in a vehicle.

2. Description of the Related Art

Generally, a seat track mechanism for a vehicle seat has a pair of substantially parallel movable rails attached to the vehicle seat in slidable relationship with a pair of substantially parallel stationary rails which are mounted on a floor section of a vehicle. The stationary rails have longitudinally extending openings of predetermined widths through which the movable rails are combined with the stationary rails so as to be slid along the stationary rails. The openings are formed in upper surfaces of the stationary rails so as to extend along longitudinal directions of the stationary rails. Both ends of the stationary rails are open.

In the conventional seat track mechanism, there is a possibility that any foreign material, for example, dirt, dust and/or mud will enter the stationary rails. Also, there is a possibility that a pointed tip end of any longitudinal product such as an umbrella will accidentally go into the stationary rail. When such foreign material and/or the pointed tip end of the longitudinal product goes into the stationary rail, the seat may be unable to be moved along the stationary rails. Particularly, in the case of a power seat track mechanism, the situation may cause the power seat track mechanism to malfunction or become inoperative.

In order to prevent dirt, dust and/or mud from going into the stationary rails, there has been proposed stationary rails that are provided with rubber covers for covering the stationary rails. The rubber covers are provided on upper surfaces of the stationary rails and have lip portions along which movable rails are slid. However, the lip portions will become permanently flexed or deformed with time and will become worn by repeatedly sliding of the seat along the stationary rails a large number of times. As a result, dirt, dust and/or mud may enter the stationary rails. Furthermore, the covers can not prevent pointed tip ends of longitudinal products from accidentally going into the stationary rails.

SUMMARY OF THE INVENTION

The present invention has been made with a view to overcoming the forgoing problem of the prior art seat track mechanism.

It is therefore an object of the present invention to provide a seat track mechanism for a vehicle seat, which can positively prevent foreign material, such as dirt, dust and/or mud, and tip ends of longitudinal products from going into stationary rails.

In accordance with the present invention, there is provided a seat track mechanism for a vehicle seat. The seat track mechanism for a vehicle seat comprises a pair of substantially parallel movable rails attached to the vehicle seat, a pair of substantially parallel stationary rails attached to a floor section of a vehicle, the movable rails being combined with the stationary rails so as to be slidable along the stationary rails, and shutter means for covering the stationary rails, the shutter means being movably supported to each of the stationary rails so as to pass around one end of a corresponding stationary rail, around the other end of the stationary rail, and then under a bottom portion of the stationary rail, the shutter means having an opening, and each of the movable rails being combined with a corresponding stationary rail through the opening.

The shutter means has an elongated endless belt. The elongated endless belt comprises a plurality of narrow strips that are disposed adjacent to one another and connected to one another by hinge pins.

The seat track mechanism further includes shutter guide means provided at each of the stationary rails. The shutter means is supported through the shutter guide means to the stationary rail so as to be movable along the stationary rail.

The vehicle seat comprises a power seat. The power seat is provided with a power slide mechanism which comprises a reversible motor attached to a side of one of the movable rails, a lead screw arranged within each of the stationary rails so as to extend along a corresponding stationary rail and supported to the stationary rail, a screw nut mounted on the lead screw so as to be movable along the lead screw and meshed with the lead screw, a gear box provided in each of the movable rails, and a worm gear arranged within the gear box, coupled to the reversible motor, and meshed with the screw nut, and the screw nut being held by the gear box.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein:

FIG. 4 is a schematic fragmentary perspective view of shutter means employed in the seat track mechanism;

FIG. 5 is a schematic sectional view showing shutter guide means for supporting and guiding the shutter means;

DETAILED DESCRIPTION OF THE PREFERRED EMBODIMENT

A seat track mechanism for a vehicle seat according to the present invention will be discussed hereinafter with reference to the accompanying drawings.

Figure 1:
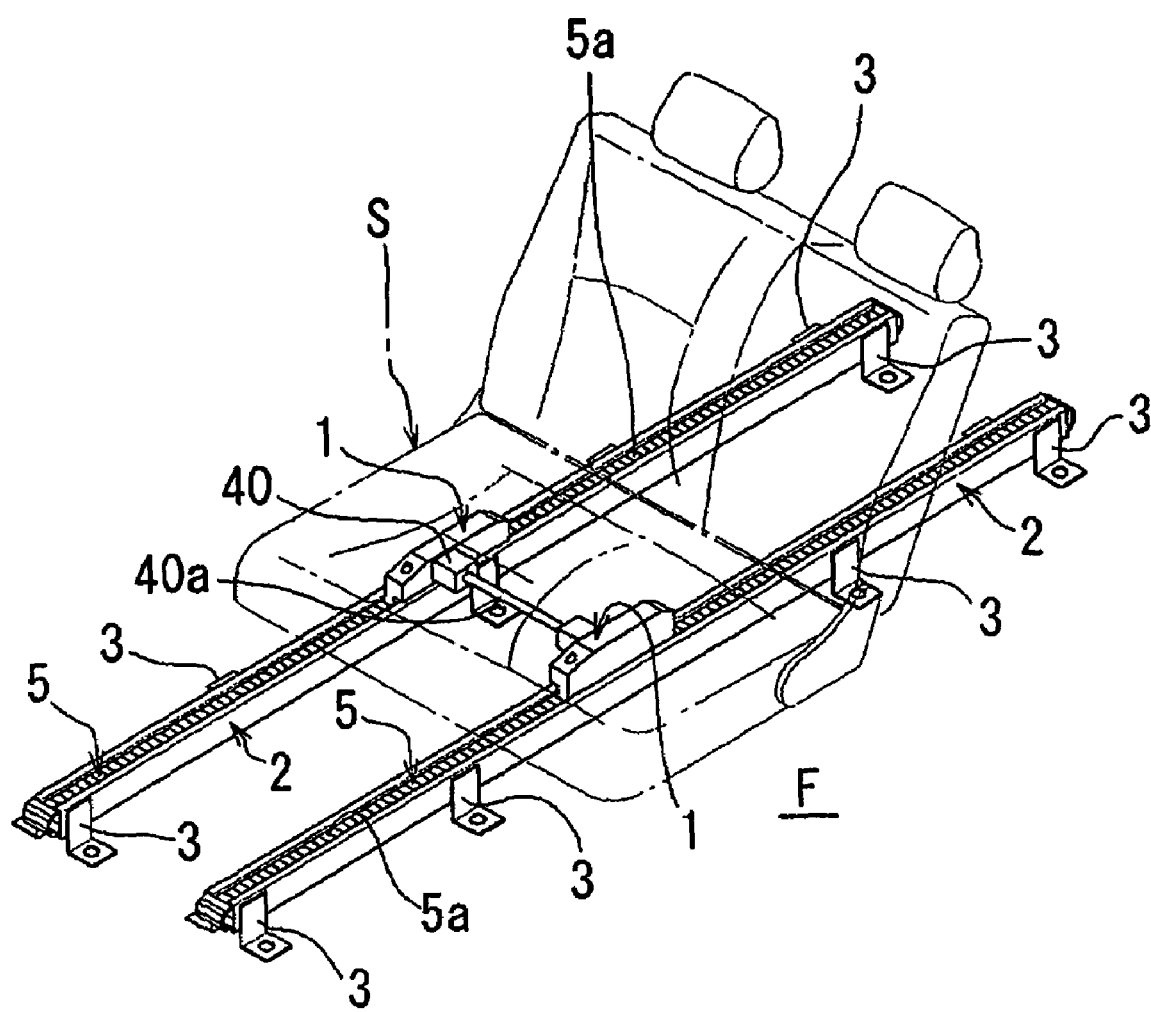
FIG. 1 is a schematic perspective view of a power seat that is provided with a seat track mechanism according to the present invention.

Referring to FIG. 1, there is illustrated a bench-type power seat (shown in phantom) which is provided with a seat track mechanism according to an embodiment of the present invention. The seat track mechanism includes a pair of substantially parallel movable rails 1 attached to a lower portion of a seat cushion S in slidable relationship with a pair of substantially parallel stationary rails 2 which are attached to a floor section F of a vehicle, for example, with L-shaped braces 3. The stationary rails 2 are attached to the floor section F of the vehicle by the L-shaped braces 3 so as to be spaced apart from the floor section F of the vehicle. The lengths of the movable rails 1 are shorter than those of the stationary rails 2.

Figure 2:
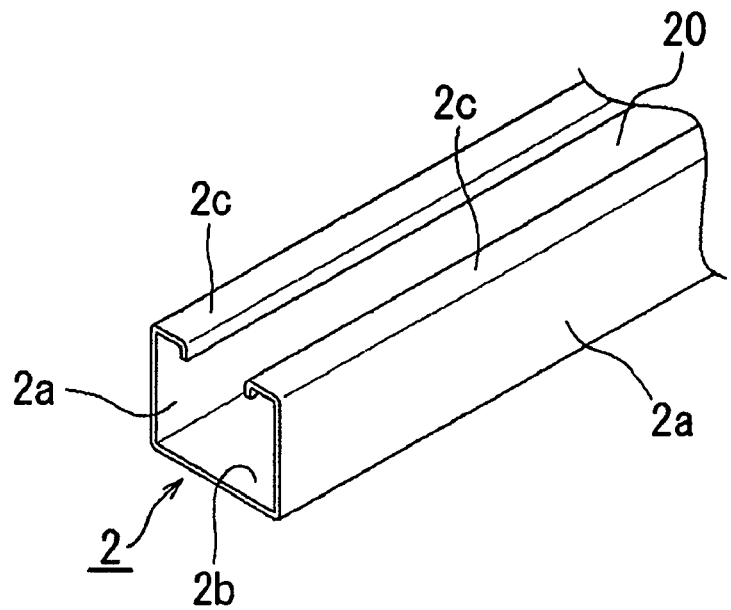
FIG. 2 is a schematic fragmentary perspective view of a stationary rail of the seat track mechanism.

Referring to FIG. 2, each of the stationary rails 2 has a longitudinal body of a substantially U-shape in cross-section. The longitudinal body of the stationary rail 2 comprises a pair of spaced apart side plate sections 2a and a bottom plate section 2b interconnecting the side plate sections 2a. Each of the side plate sections 2a is provided with an inward and downward-turned lengthwise extending flange portion 2c of a substantially L-shape in cross-section along an upper end thereof. An opening 20 is provided between flange portions 2c of the stationary rail 2. As will be discussed in greater detail hereinafter, each of the movable rails 1 is combined with a corresponding stationary rail 2 through the opening 20 and adapted to be movable along the opening 20 of the stationary rail 2.

Figure 3:
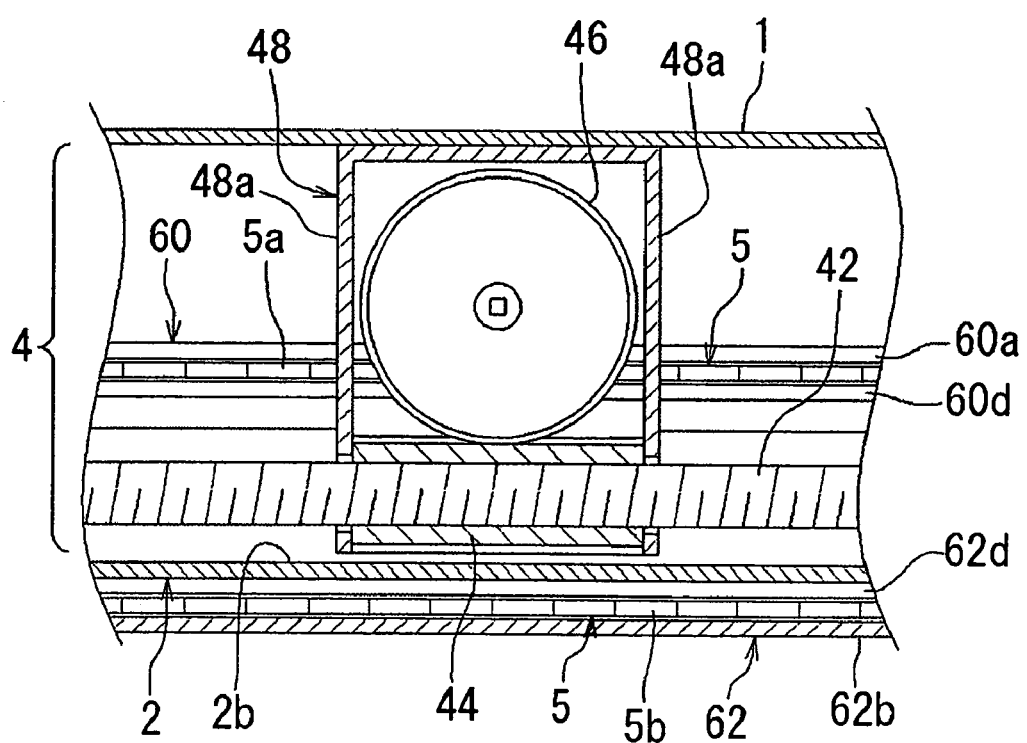
FIG. 3 is a schematic sectional view showing a power slide mechanism for causing a movable rail of the seat track mechanism to be automatically slid along the stationary rail.

Referring to FIG. 3, there is illustrated a power slide mechanism 4 for causing the seat to be automatically slid along the stationary rails 2. The power slide mechanism 4 comprises a reversible motor 40 (see FIG. 1) attached to a side of one of the movable rails 1, a lead screw 42 arranged within each of the stationary rails 2 so as to extend along the longitudinal direction of a corresponding stationary rail 2 and supported at both ends thereof to brackets (not shown) mounted on the bottom plate section 2b of the stationary rail 2, a screw nut 44 mounted on the lead screw 42 so as to be movable relative to the lead screw 42 and meshed with the lead screw 42, a gear box 48 provided in each of the movable rails 1, and a worm gear 46 housed within the gear box 48 and mounted on one end portion of a rotating shaft 40a of the reversible motor 40 (see FIG. 1) which penetrates a body of the reversible motor 40.

The screw nut 44 has an inner circumferential threaded surface (not shown) which is meshed with the lead screw 42, and an outer circumferential threaded surface (not shown) which is meshed with the worm gear 46. The worm gear 46 is rotated in clockwise and counterclockwise directions by the reversible motor 40.

Again referring to FIG. 1, the seat track mechanism according to the present invention further includes shutter means 5 that is provided at each of the stationary rails 2. The shutter means 5 has an elongated endless belt. As will be discussed in greater detail hereinafter, the shutter means 5 is supported through shutter guide means to a corresponding stationary rail 2 so as to be movable along the stationary rail 2. The endless belt of the shutter means 5 passes around one end of the stationary rail 2, around the other end of the stationary rail 2, and then under the bottom plate section 2b of the stationary rail 2. Thus, the shutter means 5 covers the stationary rail 2.

Referring now to FIG. 4, there is illustrated the endless belt of the shutter means 5 that comprises a plurality of narrow strips 50 which are disposed adjacent to one another and connected to one another by hinge pins 52. Each of the narrow strips 50 is made of resin or metal.

Referring to FIG. 5, there is illustrated the shutter guide means 6 for supporting and guiding the shutter means 5. The shutter guide means 6 is provided at each of the stationary rails 2. The shutter guide means 6 comprises a pair of upper guide members 60 and a lower guide member 62. Each of the upper guide members 60 has the same length as each of the stationary rails 2 does. Similarly, the lower guide member 62 has the same length as each of the stationary rails 2 does. Each of the upper guide members 60 comprises a first horizontal plate section 60a, a vertical plate section 60b hanging down from the first horizontal plate section 60a, and a first receiving mouth portion 60c for receiving one of both ends of an upper portion 5a of the shutter means 5. The first receiving mouth portion 60c of the shutter guide means 6 is formed by the first horizontal plate section 60a and a second horizontal plate section 60d which is projected laterally from the vertical plate section 60b in parallel with the first horizontal plate section 60a and spaced apart from the first horizontal plate section 60a. The lower guide member 62 has a body of a substantially U-shape in cross-section. The substantially U-shaped body of the lower guide member 62 comprises a pair of spaced apart side plate sections 62a, a bottom plate section 62b interconnecting the spaced apart side plate sections 62a, and second receiving mouth portions 62c for receiving both ends of a lower portion 5b of the shutter means 5. The second receiving mouth portions 62c are formed by the bottom plate section 62b and third horizontal sections 62d which are projected laterally from the side plate sections 62a in parallel with the bottom plate section 62b and spaced apart from the bottom plate section 62b.

Figure 6:
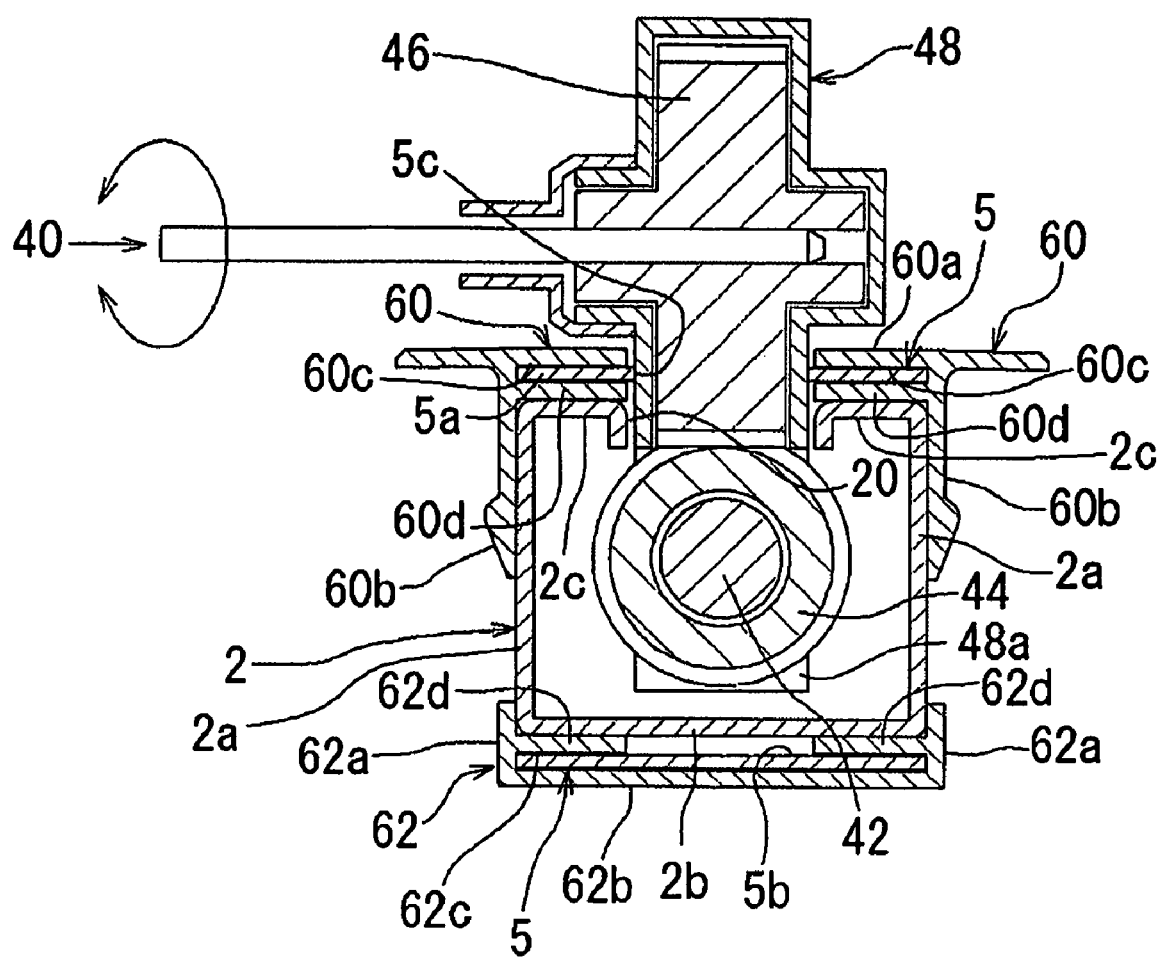
FIG. 6 is a schematic sectional view of the seat track mechanism.

Referring to FIG. 6, the upper guide members 60 are attached to a corresponding stationary rail 2 with the second horizontal plate sections 60d thereof being carried on upper surfaces of the flange portions 2c of the stationary rail 2 and with the vertical plate sections 60b thereof being engaged with outer surfaces of the side plate sections 2a of the stationary rail 2. The lower guide member 62 is mounted on a lower portion of a corresponding stationary rail 2 from the outside of the bottom plate section 2b of the stationary rail 2.

Figure 7:
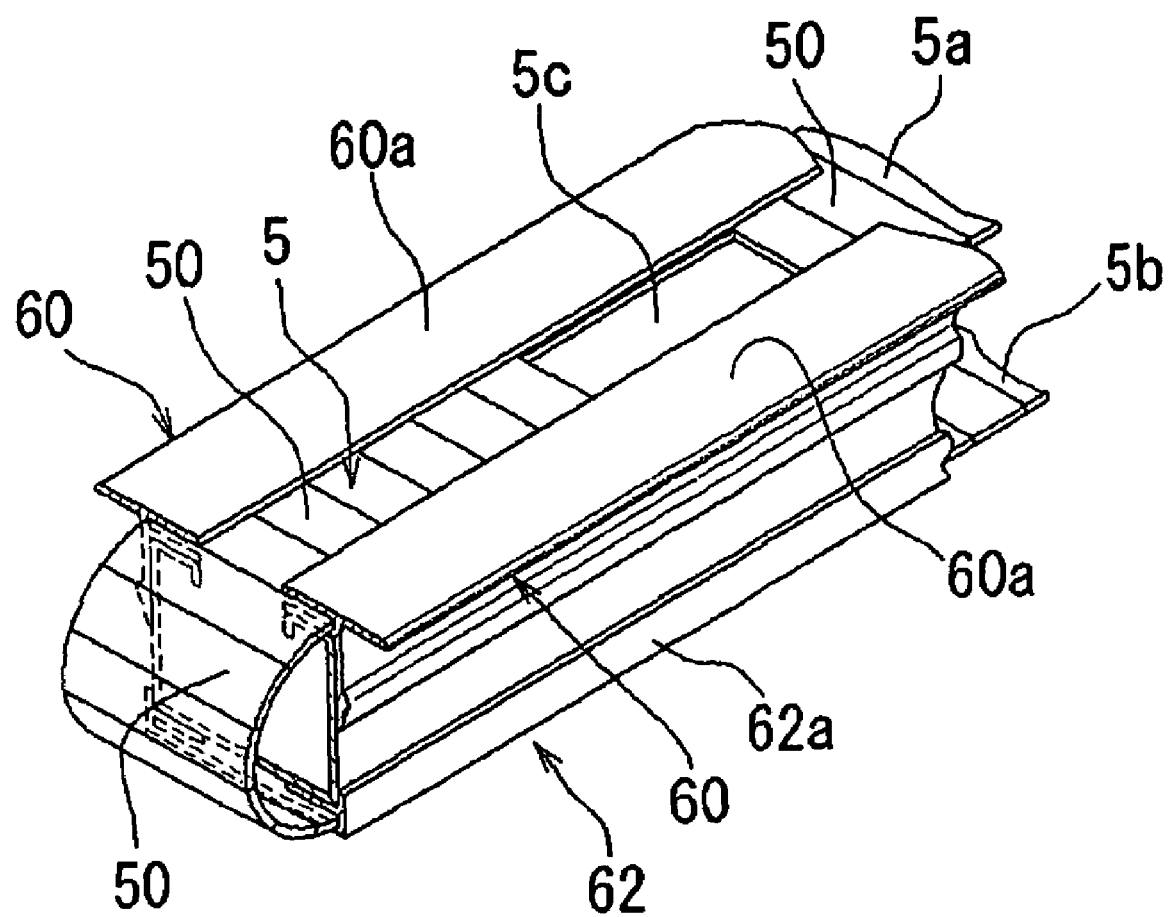
FIG. 7 is a schematic fragmentary perspective view showing the stationary rail, the shutter means, and the shutter guide means.

Referring to FIG. 7, the endless belt of the shutter means 5 which is supported by the shutter guide means 6 as described above has an opening 5c formed in the upper portion 5a thereof and exposed from a space between the first horizontal plate sections 60a of the upper guide members 60.

Again referring to FIGS. 3 and 6, the movable rail 1 is combined with the corresponding stationary rail 2 by causing a lower portion of the gear box 48 of the movable rail 1 to be inserted through the opening 5c of the shutter means 5 and the opening 20 of the stationary rail 2. In a condition where the movable rail 1 is combined with the stationary rail 2, the worm gear 46 is meshed with the screw nut 44, the lower portion of the gear box 48 receives the screw nut 44 therein, the lead screw 42 penetrates the gear box 48, and both ends of the screw nut 44 are held by spaced apart walls 48a of the gear box 48 which are spaced apart from each other in a direction perpendicular to a sheet of FIG. 6. Incidentally, roller (not shown) for allowing the seat to be smoothly moved forward and rearward along the stationary rails are disposed between both sides of the lower portion of the gear box 48 and the side plate sections 2a of the stationary rail 2.

In the seat track mechanism constructed as discussed above, when the reversible motor 40 is switched on, the worm gears 46 are rotated in the clockwise or counterclockwise direction, whereby the screw nuts 44 are moved along the lead screws 42. The movement of the screw nuts 44 along the lead screws 42 causes the gear boxes 48 of the movable rails 1 to be moved along the stationary rails 2 since the both ends of the screw nuts 44 are held by the walls 48a of the gear boxes 48, whereby the seat can be moved forward or rearward in the vehicle. Simultaneously, the shutter means 5 are traveled along the stationary rails 2. Since the shutter means 5 are supported by the shutter guide means 6 as discussed above, the shutter means can be stably traveled.

As discussed above, the shutter means 5 are movably supported by the upper guide members 60 of the shutter guide means 6 which are mounted on the upper portions of the stationary rails 2, and the lower guide members 62 of the shutter guide means 6 which are mounted on the lower portions of stationary rails 2. In this condition, the shutter means 5 cover the stationary rails 2. Therefore, in the seat track mechanism according to the present invention, dirt, dust and/or mud and pointed tip ends of any longitudinal products such as umbrellas can be positively prevented from going into the stationary rails 2.

An embodiment of the present invention has been described in connection with a seat track mechanism for a power seat. However, the invention may be applied to a seat track mechanism for a vehicle seat that is manually moved.

It will thus been seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A seat track mechanism for a vehicle seat, comprising:
    a pair of substantially parallel movable rails attachable to said vehicle seat;
    a pair of substantially parallel stationary rails attachable to a floor section of a vehicle;
    said movable rails being combined with said stationary rails so as to be slidable along said stationary rails; and
    shutter means for covering said stationary rails;
    said shutter means being movably supported to each of said stationary rails so as to pass around one end of a corresponding stationary rail, around the other end of the stationary rail, and then under a bottom portion of the stationary rail;
    said shutter means having an opening; and
    each of said movable rails being combined with a corresponding stationary rail through said opening.

2. A seat track mechanism as defined in claim 1 wherein said shutter means comprises, an elongated endless belt and said endless belt comprises a plurality of narrow strips which are disposed adjacent to one another and connected to one another by hinge pins.

3. A seat track mechanism as defined in claim 1, further including shutter guide means provided at each of said stationary rails, said shutter means being movably supported through said shutter guide means to said stationary rail so as to be movable along said stationary rail.

4. A seat track mechanism as defined in claim 2, further including shutter guide means provided at each of said stationary rails, said shutter means being movably supported through said shutter guide means to said stationary rail so as to be movable along said stationary rail.

5. A seat track mechanism as defined in claim 1 wherein said seat track mechanism is adapted for installation in a power seat.

6. A seat track mechanism as defined in claim 2 wherein said seat track mechanism is adapted for installation in a power seat.

7. A seat track mechanism as defined in claim 3 wherein said seat track mechanism is adapted for installation in a power seat.

8. A seat track mechanism as defined in claim 4 wherein said seat track mechanism is adapted for installation in a power seat.

9. A seat track mechanism as defined in claim 5 that is provided with a power slide mechanism which comprises a reversible motor attached to a side of one of said movable rails, a lead screw arranged within each of said stationary rails so as to extend along a corresponding stationary rail and supported to said stationary rail, a screw nut mounted on said lead screw so as to be movable along said lead screw and meshed with said lead screw, a gear box provided in each of said movable rails, and a worm gear arranged within said gear box, coupled to said reversible motor, and meshed with said screw nut, and said screw nut being held by said gear box.

10. A seat track mechanism as defined in claim 6 that is provided with a power slide mechanism which comprises a reversible motor attached to a side of one of said movable rails, a lead screw arranged within each of said stationary rails so as to extend along a corresponding stationary rail and supported to said stationary rail, a screw nut mounted on said lead screw so as to be movable along said lead screw and meshed with said lead screw, a gear box provided in each of said movable rails, and a worm gear arranged within said gear box, coupled to said reversible motor, and meshed with said screw nut, and said screw nut being held by said gear box.

11. A seat track mechanism as defined in claim 7 that is provided with a power slide mechanism which comprises a reversible motor attached to a side of one of said movable rails, a lead screw arranged within each of said stationary rails so as to extend along a corresponding stationary rail and supported to said stationary rail, a screw nut mounted on said lead screw so as to be movable along said lead screw and meshed with said lead screw, a gear box provided in each of said movable rails, and a worm gear arranged within said gear box, coupled to said reversible motor, and meshed with said screw nut, and said screw nut being held by said gear box.

12. A seat track mechanism as defined in claim 8 that is provided with a power slide mechanism which comprises a reversible motor attached to a side of one of said movable rails, a lead screw arranged within each of said stationary rails so as to extend along a corresponding stationary rail and supported to said stationary rail, a screw nut mounted on said lead screw so as to be movable along said lead screw and meshed with said lead screw, a gear box provided in each of said movable rails, and a worm gear arranged within said gear box, coupled to said reversible motor, and meshed with said screw nut, and said screw nut being held by said gear box.

13. A combination of a vehicle seat and a seat track mechanism, said combination comprising a vehicle seat and a seat track mechanism; said seat track mechanism comprising:
    a pair of substantially parallel movable rails attached to said vehicle seat;
    a pair of substantially parallel stationary rails attachable to a floor section of a vehicle;
    said movable rails being combined with said stationary rails so as to be slidable along said stationary rails; and
    shutter means for covering said stationary rails;
    said shutter means being movably supported to each of said stationary rails so as to pass around one end of a corresponding stationary rail, around the other end of the stationary rail, and then under a bottom portion of the stationary rail;

said shutter means having an opening; and each of said movable rails being combined with a corresponding stationary rail through said opening.

14. A combination as defined in claim 13 wherein said shutter means has a elongated endless belt, which comprises a plurality of narrow strips which are disposed adjacent to one another and connected to one another by hinge pins.

15. A combination as defined in claim 13, further including shutter guide means provided at each of said stationary rails, said shutter means being movably supported through said shutter guide means to said stationary rail so as to be movable along said stationary rail.

16. A combination as defined in claim 14, further including shutter guide means provided at each of said stationary rails, said shutter means being movably supported through said shutter guide means to said stationary rail so as to be movable along said stationary rail.

17. A combination as defined in claim 13 wherein said vehicle seat comprises a power seat.

18. A combination as defined in claim 14 wherein said vehicle seat comprises a power seat.

19. A combination as defined in claim 15 wherein said vehicle seat comprises a power seat.

20. A combination as defined in claim 16 wherein said vehicle seat comprises a power seat.

21. A combination as defined in claim 17 wherein said power seat is provided with a power slide mechanism, said power slide mechanism comprising a reversible motor attached to a side of one of said movable rails, a lead screw arranged within each of said stationary rails so as to extend along a corresponding stationary rail and supported to said stationary rail, a screw nut mounted on said lead screw so as to be movable along said lead screw and meshed with said lead screw, a gear box provided in each of said movable rails, and a worm gear arranged within said gear box, coupled to said reversible motor, and meshed with said screw nut, said screw nut being held by said gear box.

22. A combination as defined in claim 18 wherein said power seat is provided with a power slide mechanism, said power slide mechanism comprising a reversible motor attached to a side of one of said movable rails, a lead screw arranged within each of said stationary rails so as to extend along a corresponding stationary rail and supported to said stationary rail, a screw nut mounted on said lead screw so as to be movable along said lead screw and meshed with said lead screw, a gear box provided in each of said movable rails, and a worm gear arranged within said gear box, coupled to said reversible motor, and meshed with said screw nut, said screw nut being held by said gear box.

23. A combination as defined in claim 19 wherein said power seat is provided with a power slide mechanism, said power slide mechanism comprising a reversible motor attached to a side of one of said movable rails, a lead screw arranged within each of said stationary rails so as to extend along a corresponding stationary rail and supported to said stationary rail, a screw nut mounted on said lead screw so as to be movable along said lead screw and meshed with said lead screw, a gear box provided in each of said movable rails, and a worm gear arranged within said gear box, coupled to said reversible motor, and meshed with said screw nut, said screw nut being held by said gear box.

24. A combination as defined in claim 20 wherein said power seat is provided with a power slide mechanism, said power slide mechanism comprising a reversible motor attached to a aide of one of said movable rails, a lead screw arranged within each of said stationary rails so as to extend along a corresponding stationary rail and supported to said stationary rail, a screw nut mounted on said lead screw so as to be movable along said lead screw and meshed with said lead screw, a gear box provided in each of said movable rails, and a worm gear arranged within said gear box, coupled to said reversible motor, and meshed with said screw nut, said screw nut being held by said gear box.

* * * * *